United States Patent [19]

Oddo et al.

[11] Patent Number: 6,114,640
[45] Date of Patent: Sep. 5, 2000

[54] VEHICLE COLUMN STALK FUNCTIONALITY

[75] Inventors: Anthony J. Oddo, Royal Oak; Kenneth E. Zalewski, Utica; Tim W. Anness, Rochester Hills; William St Clair, Farmington Hills; Kevin J. White, Utica; Michael A. Dahl, Royal Oak, all of Mich.

[73] Assignee: DaimlerChrysler Corporation, Auburn Hills, Mich.

[21] Appl. No.: 09/260,392

[22] Filed: Mar. 1, 1999

[51] Int. Cl.[7] .................................................... H01H 9/00
[52] U.S. Cl. ...................................... 200/61.27; 200/61.54
[58] Field of Search ............................. 200/61.27, 61.54

[56] References Cited

U.S. PATENT DOCUMENTS

| | | |
|---|---|---|
| D. 256,575 | 8/1980 | Moore . |
| 4,387,279 | 6/1983 | Brevick . |
| 4,849,585 | 7/1989 | Vidican et al. . |
| 5,003,132 | 3/1991 | Lagier . |
| 5,075,519 | 12/1991 | Hayakawa . |
| 5,107,243 | 4/1992 | Maeda . |
| 5,272,290 | 12/1993 | Suzuki et al. . |
| 5,581,058 | 12/1996 | Javery et al. ................. 200/61.27 X |
| 5,736,700 | 4/1998 | Takahashi et al. ............. 200/61.54 |
| 5,780,796 | 7/1998 | Uchiyama et al. . |
| 6,025,565 | 2/2000 | Miyase et al. ................. 200/61.54 X |

*Primary Examiner*—Renee Luebke
*Attorney, Agent, or Firm*—Marc Lorelli

[57] ABSTRACT

A column stalk assembly for controlling lighting and wiper functions of a motor vehicle is provided. The column stalk includes a wiper stalk controlling the front wipers, rear wipers, front washer, and rear washer of the motor vehicle and a lighting stalk controlling the headlamps, high beam headlamps, interior lights, and turn signals of the motor vehicle, the wiper stalk and the lighting stalk being structurally similar. Each stalk includes an outer rotatable knob and an inner rotatable ring separated by a stationary ring. The stationary ring cooperates with the outer knob to control a specific function. Each stalk also includes a base disposed adjacent to the inner ring. The base cooperates with the inner ring to control a specific function.

1 Claim, 7 Drawing Sheets

VEHICLE COLUMN STALK FUNCTIONALITY

BACKGROUND OF THE INVENTION

1. Technical Field

The present invention generally pertains to column stalks for automotive vehicles. More particularly, the present invention relates to a column stalk system for controlling vehicle lighting and wiper functions. More specifically, but without restriction to the particular embodiment and/or use which is shown and described for purposes of illustration, the present invention relates to a column stalk system having two column stalks, one stalk for controlling the lighting functions of a vehicle, and the other controlling the wiper functions of the vehicle.

2. Discussion

Automotive vehicles have traditionally been equipped with windshield wipers and headlights. As technology has progressed, interior lights and windshield washers have been added to the compliment of standard equipment on most cars and trucks.

Modern vehicles have a vast array of lighting functions: headlamps, parking lamps, fog lamps, turn signals, high beams, and interior dome lights. The controls for these lighting functions have been placed at various locations within the passenger cabin. Some controls have been placed on the column stalks, others have been placed on the instrument panel, and some have even been placed out of the driver's reach. This placement of controls tends to induce difficulty for the operator to locate and operate the lighting functions.

The wiper functions have been just as sporadic with respect to the placement of controls throughout the cabin. There has been a continual need to provide all of the wiper controls and all of the lighting controls in locations ergonomically compatible with the driver of the vehicle. Optimally, all controls would be easily accessible to the driver while operating the vehicle. There has also been a need to group similar controls in a centralized place in a systematic and efficient manner. There is also a continual need to reduce complexity and simplify design of all components of a vehicle to reduce costs.

SUMMARY OF THE INVENTION

Accordingly, it is a general objective of the present invention to provide a column stalk system for controlling vehicle lighting and wiper functions.

It is another objective to provide a column stalk with all the lighting controls located thereon.

It is yet another objective of the present invention to provide a column stalk with all the wiper controls located thereon.

It is a further objective of the invention to provide a column stalk system with essentially identical stalks wherein a first stalk controls the lighting functions and a second stalk controls the wiper functions.

In one form, the present invention provides a column stalk system for a motor vehicle. The column stalk system includes a wiper stalk controlling the front wipers, rear wipers, front washer, and rear washer of the motor vehicle. The column stalk system also includes a lighting stalk controlling the headlamps, high beam headlamps, interior lights, and turn signals of the motor vehicle. The wiper stalk and the lighting stalk are essentially identical. Each stalk includes an outer rotatable knob and an inner rotatable ring separated by a stationary ring. The stationary ring cooperates with the outer knob to control a specific function. Each stalk also includes a base disposed adjacent to and the inner ring. The base cooperates with the inner ring to control a specific function.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
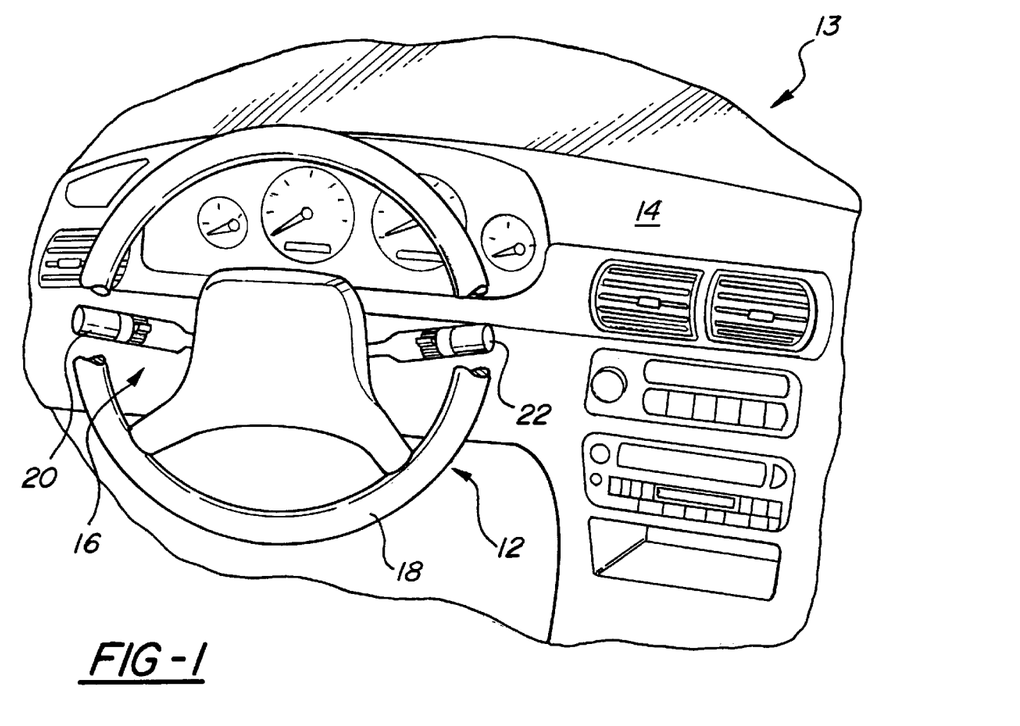
FIG. 1 is a perspective view illustrating a steering column and an instrument panel in the environment of a motor vehicle.
Figure 2:
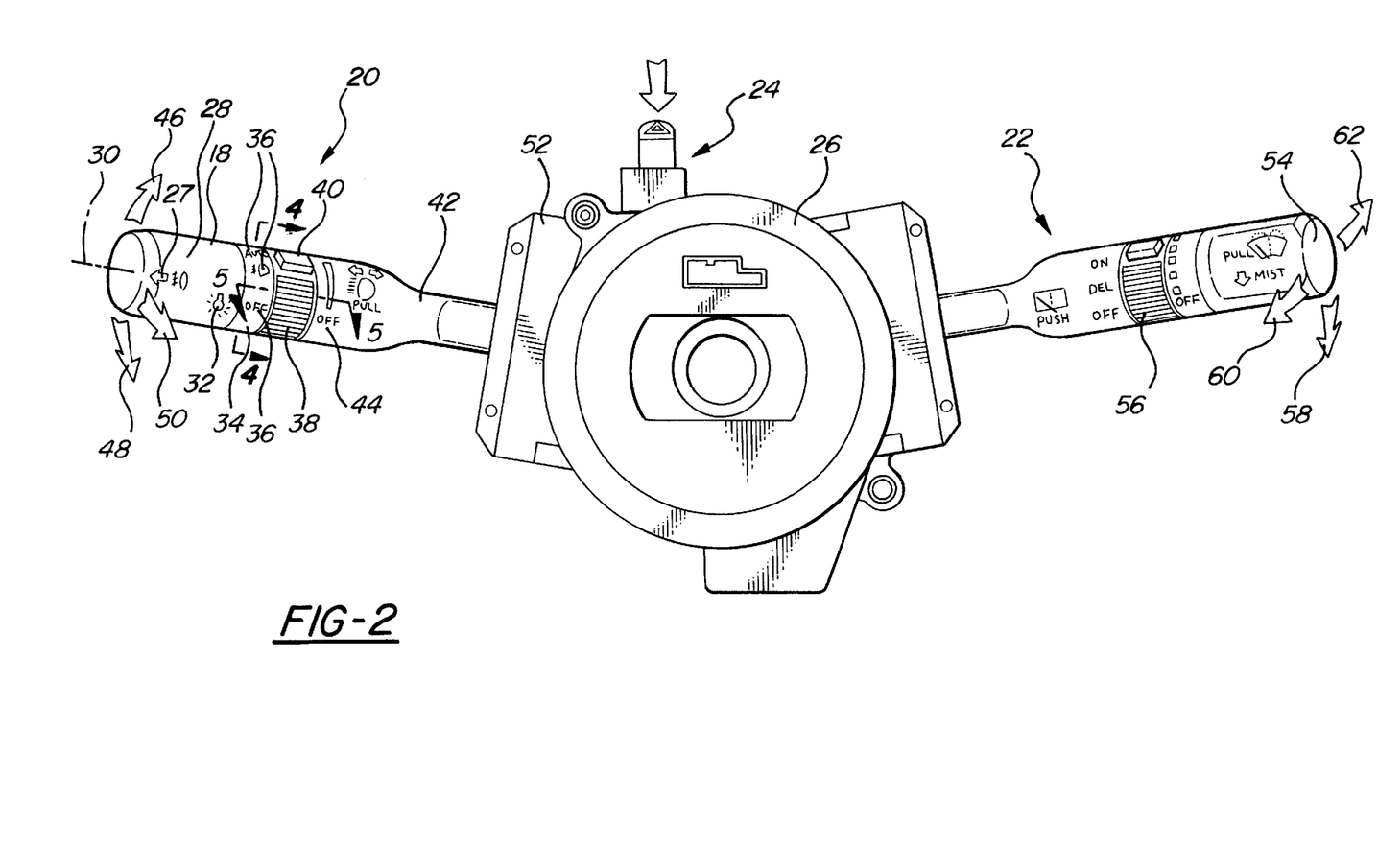
FIG. 2 is a perspective view illustrating a column stalk assembly removed from a vehicle.

Turning first to the perspective view of FIG. 1, steering column 12 of vehicle 13 is illustrated. Instrument panel 14 is disposed forward of steering column 12. Steering column 12 includes a column stalk assembly 16 disposed in close proximity behind a steering wheel 18. A separate view of the column stalk assembly 16 is shown in FIG. 2 and contains two substantially identical column stalks 20, 22 and a hazard switch portion 24. A central mounting portion 26 attaches directly to steering column 12. Column stalk 20 disposed to the left of mounting portion 26 controls lighting functions of vehicle 13. Column stalk 20 has outer knob 28 that controls the activation of the headlamp, the parking light, and may even activate the fog lamps of vehicle 13. Specifically, outer knob 28 can be rotated about the longitudinal axis 30 of column stalk 20 to select one or more of the previously described functions. Outer knob 28 includes an indicator marking or indicia 32 disposed adjacent to stationary ring 34. Stationary ring 34 includes a plurality of operational labels 36 so that as the knob is rotated the indicator marking 32 moves between the different labels 36 to indicate the function selected. In addition to rotation, the control knob 28 can be moved in a longitudinal direction indicated by the arrow 27 of the outer knob 28 to activate fog lamps or another lighting function of vehicle 13. Indicator arrow 27 shows the direction of this function.

Stationary ring 34 does not rotate about longitudinal axis 30 as does outer knob 28. An inner ring 36 is located to the right of stationary ring 34. Inner ring 38 rotates about longitudinal axis 30 in a manner similar to outer knob 28. Inner ring 38 includes a setting marking or indicia 40 disposed adjacent to base 42, and base 42 includes a plurality of functional labels 44 which are cooperative with setting marking 40 as the inner ring 38 is rotated to indicate the selected function of the interior lights. Column stalk 20 can also be pivoted upward, as shown by arrow 46, to control the right turn signal function of vehicle 13 and can be pivoted downward, as shown by arrow 48, to control the left turn signal function of vehicle 13. Column stalk 20 can also be pivoted or pulled inward, as shown by arrow 50, towards steering wheel 12 to activate the high beams of vehicle 13. As seen in FIG. 2, the column stalk 20 is attached and operably connected to column module 52.

The rightwardly located column stalk 22 is structurally similar to column stalk 20; but instead of the lighting functions, column stalk 22 controls the wiper functions of vehicle 13. Rotation of outer knob 54 controls the speed of the front windshield wipers of vehicle 13. Rotation of inner ring 56 controls the speed of the rear window wipers of vehicle 13. Column stalk 22 can be pivoted downward, as shown by arrow 58, to provide control for a single pass of front windshield wiper over the windshield. Column stalk 22 can be pulled toward the vehicle operator or pivoted inward, as shown by arrow 60, to provide control of a washer for the front windshield of vehicle 13. Column 22 can also be pushed away from the vehicle operator or pivoted outward, as shown by arrow 62, to provide control of a washer for the rear window of vehicle 13.

Figure 3:
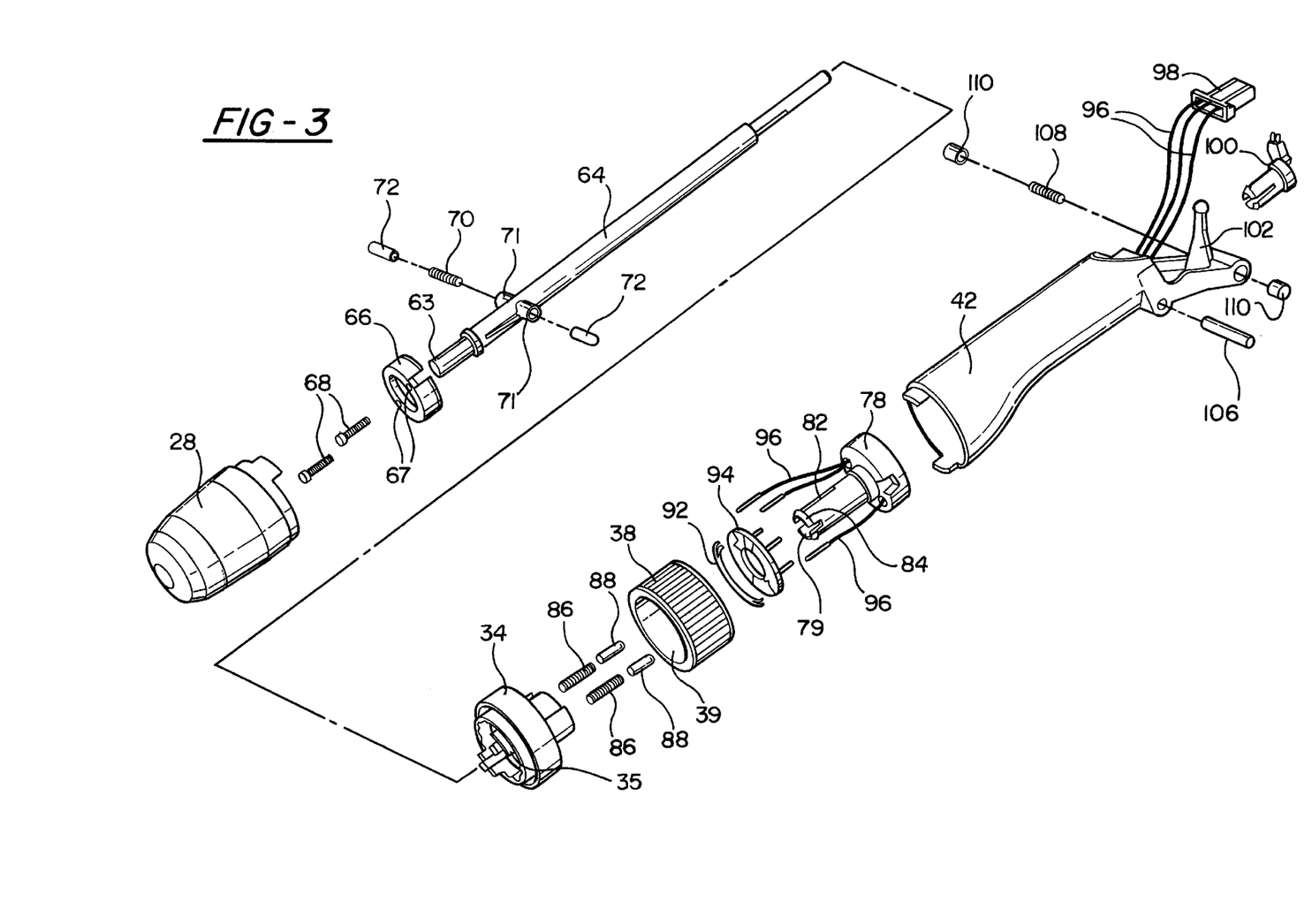
FIG. 3 is an exploded view of a column stalk having an outer knob, stationary ring, and an inner ring.
Figure 4:
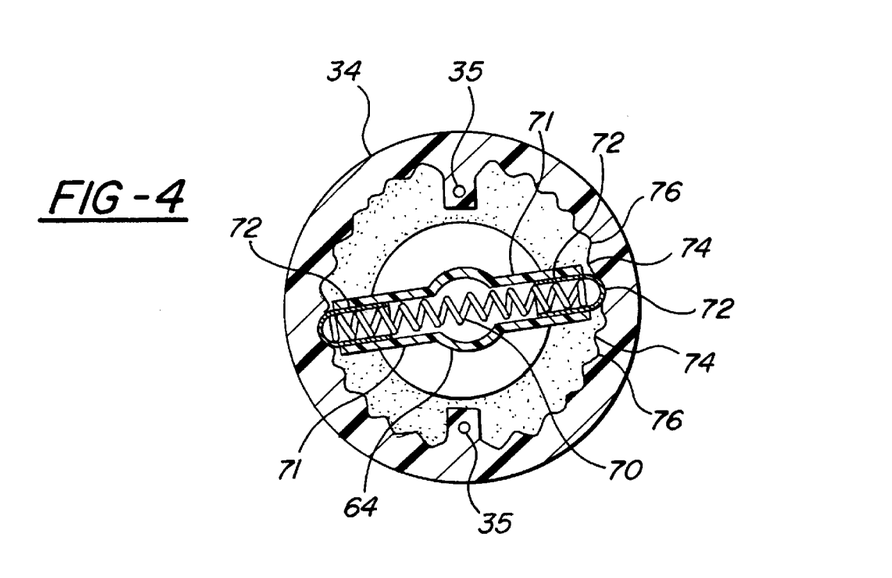
FIG. 4 is a traverse cross sectional view of an assembled column stalk through the stationary ring along the line 4—4 in FIG. 2.

FIG. 3 provides an exploded view of column stalk 20, which is structurally similar to column stalk 22. Outer knob 28 receives end 63 of rod 64. A pin (not shown) is used to lock outer knob 28 and rod 64 together. Rod 64 is rotated about the longitudinal axis 30 of column stalk 20 by rotation of outer knob 28. Screws 68 attach an annulus 66 to stationary ring 34. Specifically, annulus 66 has holes 67 therethrough and stationary ring 34 has bores 35 therein to accept screws 68. Neither annulus 66 nor ring 34 rotates with rod 64. Rod 64 contains a traversely directed spring 70 and bullet shaped hallow end or shell 72 arranged to cooperate with stationary ring 34 to provide a plurality of detents for rotatably positioning outer knob 28. FIG. 4 shows a sectional view of ring 34, along the line 4—4 of FIG. 2, of the assembled column stalk. The interior of stationary ring 34 has a number of peaks 74 and valleys 76 cooperative with the ends of the bullet shaped shells 72. Each valley 76 corresponds to a detent position of outer knob 28. As outer knob 28 is rotated about the longitudinal axis 30 of column stalk 20, a peak 74 causes the spring 70 to be compressed to accommodate the transfer thereby. As the rod 64 is rotated enough for the bullet shaped shells 72 to overcome a peak 74 and settle into a valley 76, the spring 70 can relax as the bullet shaped shells 72 move outward; thereby providing a detent. The force of spring 70 in conjunction with the peak 74 and valley 76 arrangement on the interior of stationary ring 34 provides for a plurality of detents for outer knob 28. Annulus 66 and stationary ring 34 entrap a spring tube member 71 therebetween, which limits longitudinal or axial movement of outer knob 28 and rod 64. One can appreciate that an additional detent can be provided by relaxing the entrapment of the spring tub 71 and providing a peak and valley system in the axial direction on the stationary ring 34. This would allow the outer knob 28 to be pulled axially outboard to provide an additional functional position, by which the fog lamps could be controlled.

Figure 5:
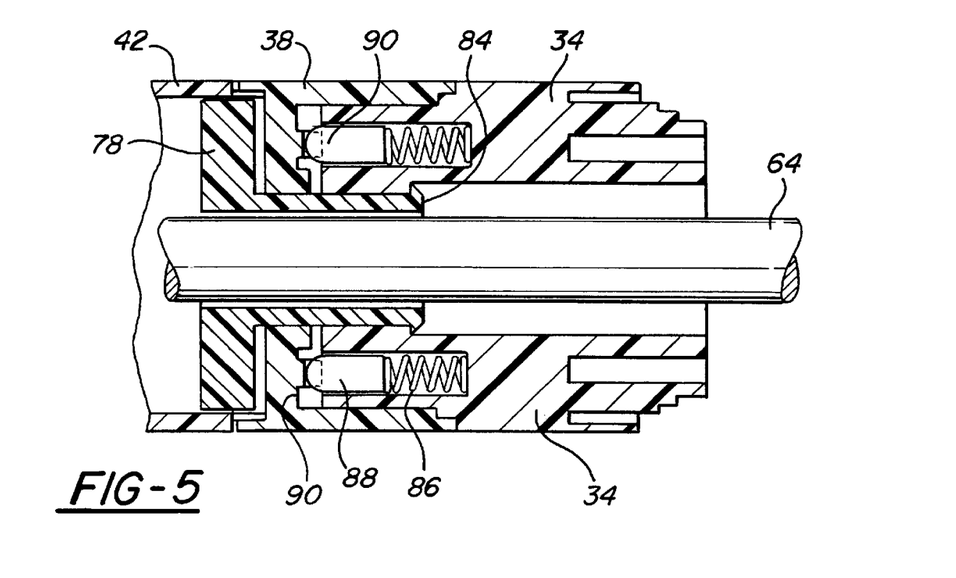
FIG. 5 is a longitudinal cross sectional view of the detent mechanism for the inner ring along the line 5—5 of FIG. 2.

Turning back to FIG. 3, a base extension 78 is tightly secured into base portion 42 by a press fit design or any other suitable means of attachment. Base extension 78 includes an apertured boss portion 79 for reception of rod 64. Base extension 78 is a stationary component with respect to the column stalk 20 and has a groove 82 and an end clip configuration 84 to provide a non-moving attachment to stationary ring 34 (mating formations on stationary ring are not shown). Groove 82 prevents axial rotation of stationary ring 34 and the end clip configuration 84 prevents axial movement of stationary ring 34. The stationary ring 34 and the base portion 42 entrap inner ring 38 therebetween, in a manner which allows inner ring 38 to rotate about the longitudinal axis 30 of column stalk 20. The inner ring 38 includes a central bore 39 to accept rod 64 and to provide rotation of ring 38 independent of rotation of rod 64, as the inner ring 38 is not attached to rod 64. A detent for positioning the inner ring 38 is provided by use of a pair of springs 86 and dual bullets 88 carried by stationary ring 34. A system of peaks and valleys, similar to the outer knob 28 detent system, is provided on a surface of the inner ring 38, as seen in FIG. 5, which is a cross sectional view of the detent system for the inner ring 38 as taken along the line 5—5 of FIG. 2. The peaks and valleys arrangement 90 is disposed in an annular fashion on a central wall of inner ring 38. A shown in FIG. 3, a resilient crescent arm 92 lies adjacent to inner ring 38 and is attached to the side adjacent to base portion 42. The crescent arm 92 cooperates with the contact plate 94 attached to base extension 78. As inner ring 38 is rotated, crescent arm 92 makes various electrical contacts with a plurality of contacts on a contact plate 94, thereby providing different electrical functions from vehicle 13. The plurality of contacts on contact plate 94 are attached to electrical wires 96 which lead to a connector 98. The desired function of either the lighting or wiper functions are electrically sent to vehicle 13 via connector 98. Base portion 42 is hallow to accept rod 64 and wires 96 therethrough. Rod 64 terminates in an attachment to a pinion gear arrangement 100. Details of the gear arrangement 100 are shown in FIG. 8.

Figure 6:
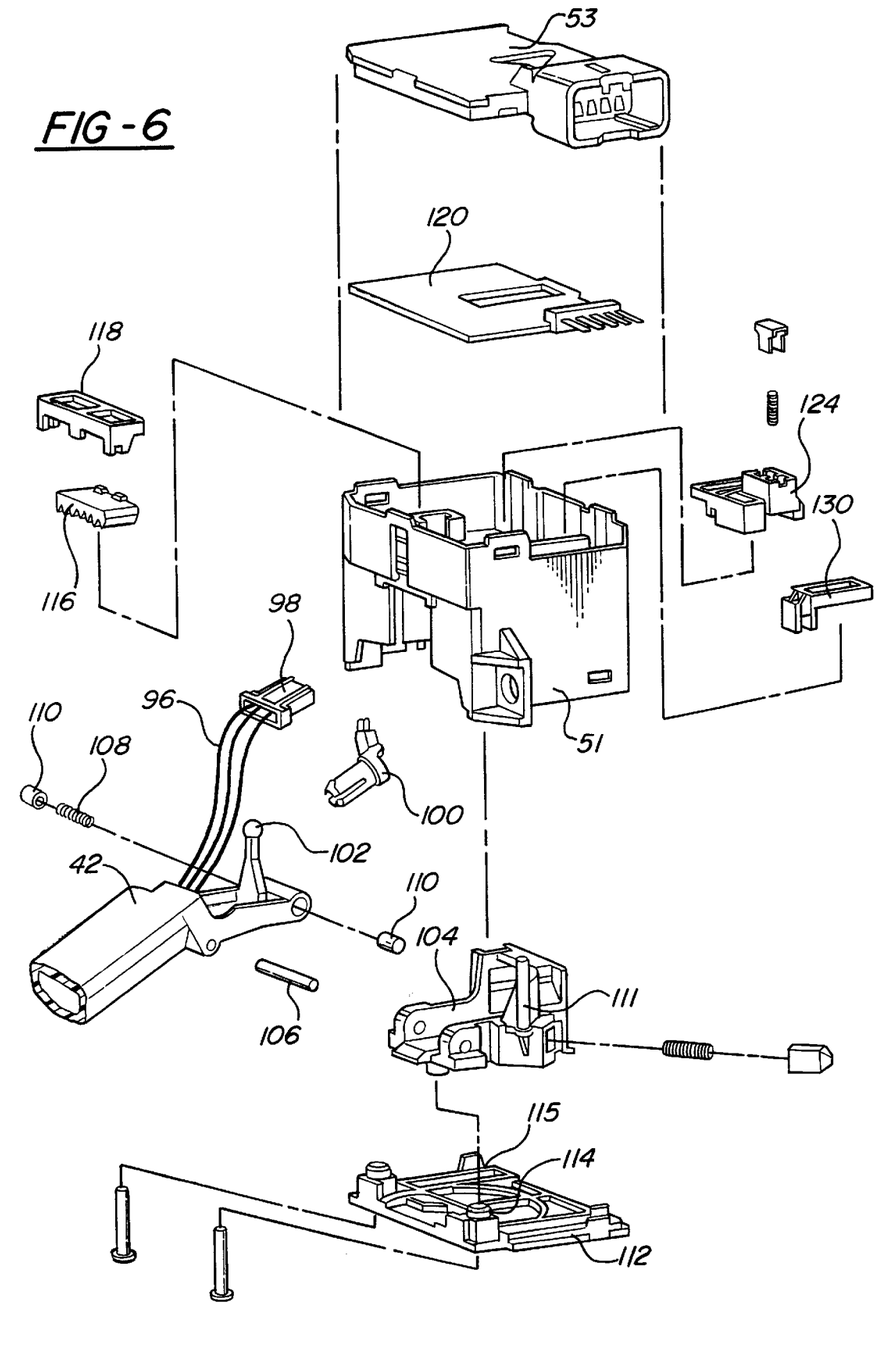
FIG. 6 is an exploded view of a column stalk module.

FIG. 6 provides an exploded view of the column module 52 and the attachment between column stalk 20 and column module 52. Column module 52 includes housing 51 and a cover 53. Base portion 42 of column stalk 20 includes a control arm 102 extending within column module 52. The stalk's base portion 42 is pivotally attached to stalk cradle 104 via pin 106 to provide forward/backward movements of column stalk 20. Base portion 42 and cradle 104 can be moved together in the forward/backward motion as guided by a detent system comprised of a spring 108 and two end caps 110 supported in an aperture in base portion 42. The end caps 110 engage a series of peaks and valleys (not shown) formed on cradle member 104. Cradle 104 includes a cylindrical projection 111 as is pivotally mounted to plate member 112 about a boss formation 114 thereon. Plate 112 is disposed between steering wheel 18 and cradle 104. Pivotal movements of cradle 104 about the boss 114 on plate 112 provides for upward/downward movements of column stalk 20 by pivotal movement about axis 115. One can appreciate that many systems of providing detent mechanisms and systems for selectively limiting movement of the column stalk to achieve the desired column stalk functions may be applied.

Figure 7:
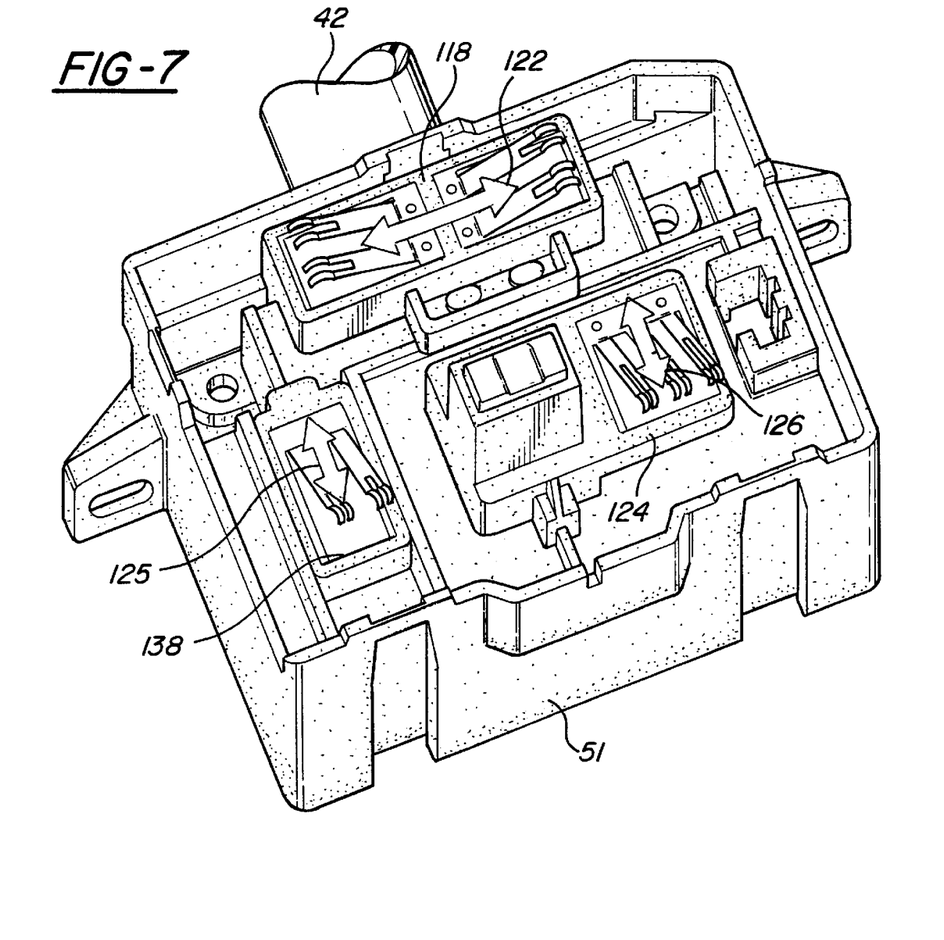
FIG. 7 is a perspective view of a column stalk module with the circuit board and cover removed.
Figure 8:
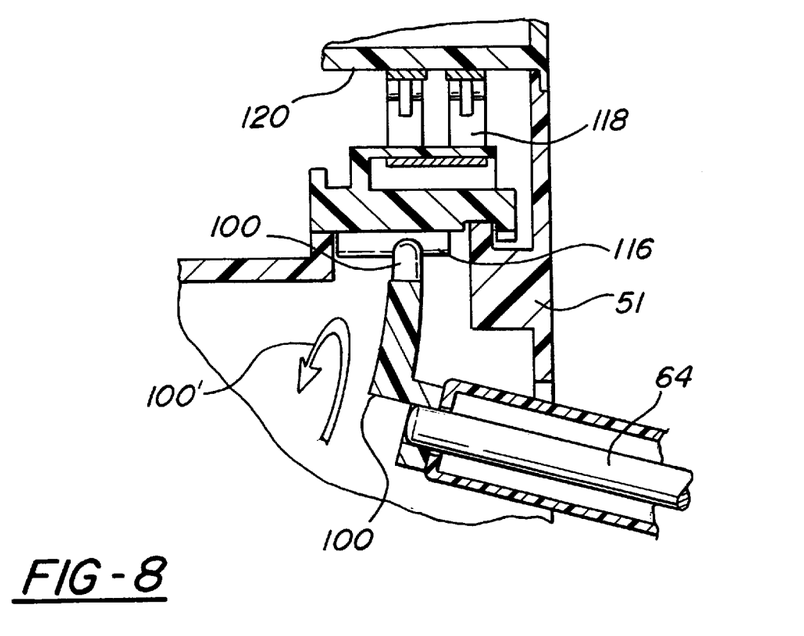
FIG. 8 is a cross sectional view along of a pinion gear and rack arrangement associated with the rotational movement of an outer knob.
Figure 9:
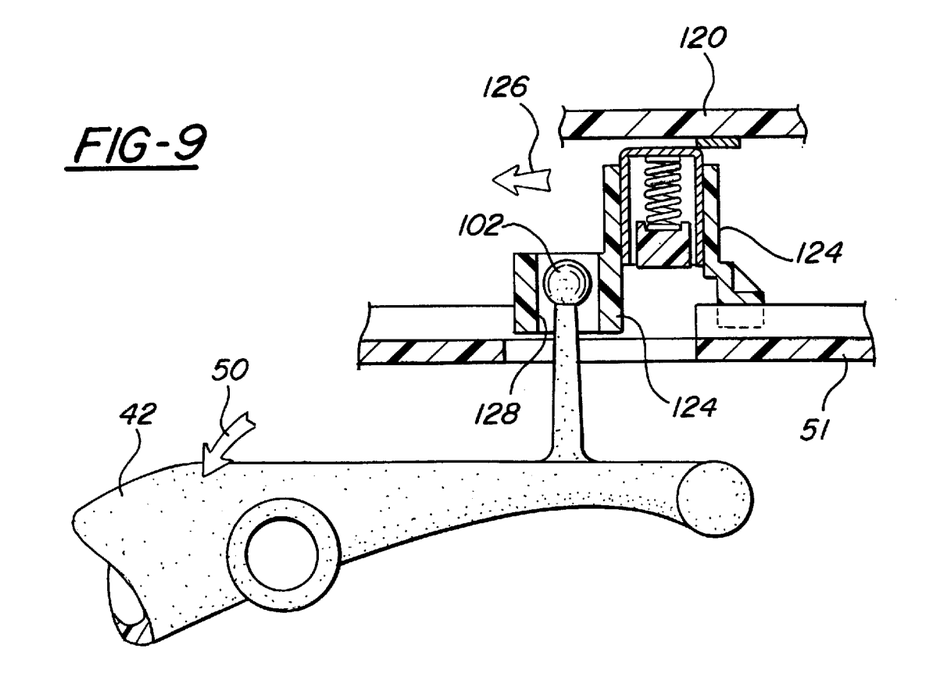
FIG. 9 is a cross sectional view of the control arm showing the forward and backward movement of a column stalk.

By reference to FIGS. 8 and 9, it can be seen that pinion gear 100 connected to rod 64 contacts rack 116 that carries an electrical contactor 118. Electrical contactor 118 slidingly contacts circuit elements on circuit board 120 to alternatively activate different electrical functions of vehicle 13. Contactor 118 is seen in FIG. 7 where its movement in directions 122 is best shown. Arrow 100' in FIG. 8 illustrates one rotative movement of the pinion gear 100 caused by a corresponding rotation of rod 64. In the preferred embodiment, outer knob controls rotation of rod 64 that in turn controls movement of pinion gear 100. Pinion gear 100 contacts the electrical contactor 118 via rack 116 that establishes a selective electrical function by its contact with circuit board 120. The electrical contactor 118 will slide in a direction 122 shown in FIG. 7. Circuit board 120 sends a signal to a controller or component dependent upon the position of electrical contactor 118. For example, the speed of the front windshield wipers of vehicle 13 can be controlled. The various movements of the column stalk 20 form contacts to signal a vehicle's electronics, most often, via circuit board 120. These different contacts provide control of numerous functions of vehicle 13.

Figure 10:
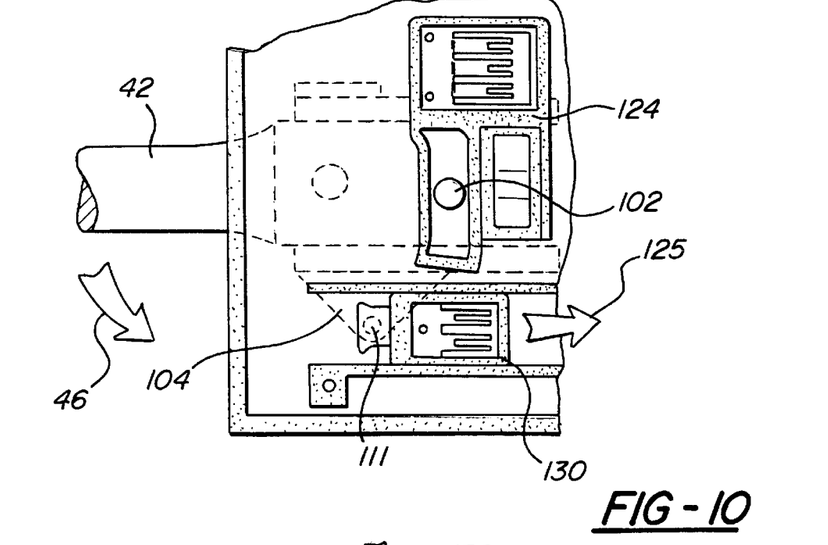
FIG. 10 is a cross sectional view of the cylindrical projection with the upward and downward movement of a column stalk.

The cradle member 104 remains stationary as column stalk 20 is pivoted forward and backward. Movement of control arm 102 extending from the column stalk 20 moves modified contactor assembly 124 in direction 126 as illustrated in FIGS. 7 and 9. Modified contactor 124 includes an elongated reception port 128 that receives the free end of control arm 102. One can appreciate that movement of control arm 102 in response to upward and downward pivoting of the column stalk 20 will not cause movement of modified contactor 124, but will cause movement in response to forward and backward pivoting. Movement of the modified contactor 124 will change contact with circuit board 120 and thereby produce a change in the activation of the electrical functions of vehicle 13. As column stalk 20 is pivoted upward and downward, cylindrical projection 111 of stalk cradle 104 forces additional contactor 130 to move in a direction 125 illustrated in FIGS. 7 and 10. This movement of contactor 130, which is in contact with circuit board 120, electrically produces a change in the functions of vehicle 13.

Figure 11:
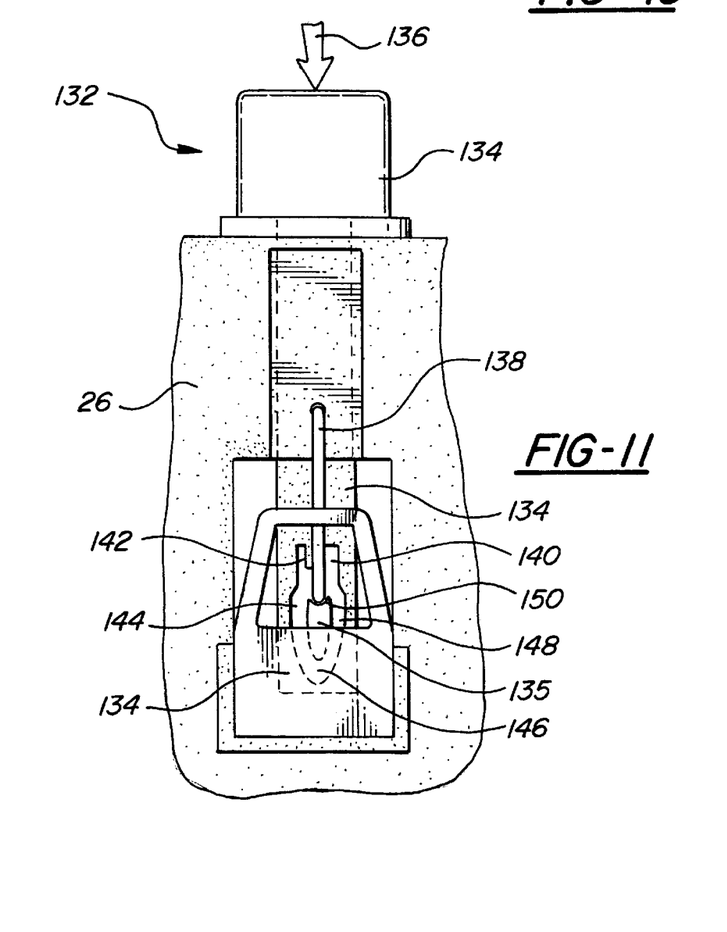
FIG. 11 is a rearward view of the hazard portion of the column stalk assembly.

One can appreciate that a total 6 different mechanisms per column stalk 20, 22 can be used to provide control over certain electrical functions of vehicle 13. Two of the 6 mechanisms, i.e., the rotatable outer knob and inner ring can provide a plurality of operational functions by use of detents. In addition, on the top of the column stalk assembly 16 the hazard switch assembly 24 is disposed. Switch assembly 24 includes a hazard activation button 134, which can be depressed in the direction 136 as illustrated in FIG. 11. Button 134 is biased upward towards an active position by a spring mechanism (not shown). Button 134 is shown in its inactive depressed position in FIG. 11. To activate the hazard system, the operator of vehicle 13 depresses button 134 further, which causes the spring mechanism to release the button 134 towards its upward activated position. In the preferred embodiment the upward relaxed position of button 134 connects the hazard signal. When button 134 is in the downward or depressed position the connection will be broken and the hazard signal terminate. Specifically, this action is provided by a hooked pin 138 swingingly attached to mounting portion 26. The pin 138 extends downwards and hooks inward to operate within a cavity 140 of button 134. Hooked pin 138 acts to provide a means to provide a detent between the relaxed and depressed positions of button 134.

One can appreciate that as the button 134 is pressed or released, the cavity will have vertical movement accordingly. As button 134 is depressed, a wedge 142 contacts hooked pin 138 and urges it to the left, as button 134 is released, the spring mechanism forces the button 134 upward. During this upward movement of button 134, hooked pin 138 moves along the left channel 144 of cavity 140. Button 134 has limited upward movement due to the position of the bottom 146 of cavity 140. In the preferred embodiment, this is the on position for the hazard signal. When button 134 is depressed again the pin operates in the right channel 148 of cavity 140. When button 134 is fully depressed then released the pin will be urged toward pocket 150 of formation 135 to provide a stop for the depressed position. This is the off position of the hazard signal.

While the above description constitutes the preferred embodiment of the invention, it will be appreciated that the invention is susceptible to modification, variation, and change without departing from the proper scope or fair meaning of the accompanying claims.

What is claimed is:

1. A column stalk system mounted on a steering column of a motor vehicle, said motor vehicle having interior dome lights, headlamps, high beams, fog lamps, a front wiper, a rear wiper, a front washer, a rear washer, the column stalk system comprising:

a wiper stalk disposed on a first side of the steering column including:
   a first outer knob rotatable for controlling the speed of the front wiper, said first outer knob having a plurality of detents including one for high speed operation, one for low speed operation, and one for intermittent operation;
   a first inner ring rotatable for controlling the speed of the rear wiper, said first inner ring including a plurality of detents including one for continuous operation of the rear wiper;
   a first pivoting base for movement of the wiper stalk with respect to the steering column having a first movement and a second movement;
   said first movement for operating the front washer; and
   said second movement for operating the rear washer;

a lighting stalk, structurally similar to said wiper stalk, said lighting stalk being disposed on a second side of the steering column, said lighting stalk including:
   a second outer knob structurally similar to said first outer knob, said second outer knob rotatable for controlling the headlamp operation of the vehicle, said second outer knob having a number of detents;
   a second inner ring structurally similar to said first inner ring, said second inner ring rotatable for controlling the interior dome lights of the vehicle;
   a second pivoting base for movement of the lighting stalk with respect to the steering column having a third, fourth and fifth movement;
   said third movement for operating the left turn signal;
   said fourth movement for operating the right turn signal; and
   said fifth movement for operating the high beams, wherein said outer knob of said lighting stalk is supported to allow it to be pulled outboard axially to control the fog lamps of the vehicle.

* * * * *